JAMES R. FINLEY.

Improvement in Trace Couplings.

No. 121,350.　　　　　　　　　　　　Patented Nov. 28, 1871.

Witnesses.
Geo. N. Howard.
H. A. Daniels

J. R. Finley, Inventor.
Chas. S. Whitman, Attorney

UNITED STATES PATENT OFFICE.

JAMES R. FINLEY, OF DELPHI, INDIANA.

IMPROVEMENT IN TRACE-COUPLINGS.

Specification forming part of Letters Patent No. 121,350, dated November 28, 1871.

*To all whom it may concern:*

Be it known that I, JAMES R. FINLEY, of Delphi, in the county of Carroll and in the State of Indiana, have invented an Improved Trace-Coupling or Attachment for Harness; and do hereby declare that the following description, taken in connection with the accompanying drawing hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to improvements in trace-couplings; and the nature thereof consists in constructing and combining the tug-hook or fastener with the ferrule on the end of the single-tree, as hereinafter shown and described.

Figure 1:
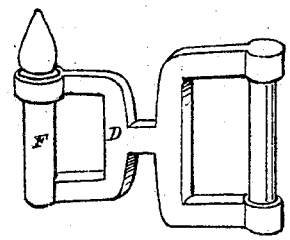
Figure 2:
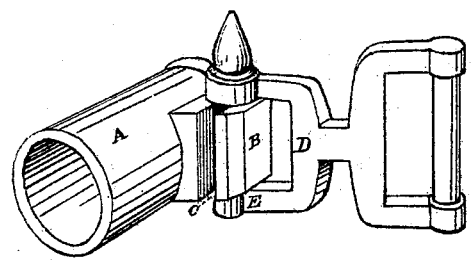

In the accompanying drawing, which illustrates my invention and forms a part of the specification thereof, in which corresponding parts are illustrated by similar letters, Figure 1 illustrates the fastener. Fig. 2 represents the coupling when the component parts thereof are united.

The construction and operation of my invention is as follows: A designates the ferrule on the end of the single-tree, upon which is cast or rigidly attached the joint B, which is provided with an aperture, C, for the reception of the fastener D. The opening of the said aperture is of just sufficient width to admit of the passage of the shackle E, while the interior portion thereof is of cylindrical form in order to receive the cylindrical pin F.

Having thus described my invention, I will indicate in the following clause what I claim and desire to secure by Letters Patent:

A trace-coupling, consisting of the ferrule A, slotted joint B, and fastener D, of the form shown, when constructed and arranged together for operation as described.

In testimony that I claim the foregoing I have hereunto set my hand and seal this 3d day of July, 1871.

JAMES R. FINLEY. [L. S.]

Witnesses:
 WALTER BEACH,
 WILLIAM GROS.     (23)